United States Patent [19]

McGivern

[11] 4,059,529
[45] Nov. 22, 1977

[54] BAFFLE FOR WATER OR SEWAGE SETTLING TANKS

[75] Inventor: Robert F. McGivern, Columbus, Ohio

[73] Assignee: Sybron Corporation, Rochester, N.Y.

[21] Appl. No.: 686,947

[22] Filed: May 17, 1976

[51] Int. Cl.² .......................................... B01D 21/24
[52] U.S. Cl. ................................. 210/519; 210/320; 210/456; 428/131
[58] Field of Search ........... 210/519, 456, 521, 532 R, 210/320, 532 S; 428/121, 131; 23/285

[56] References Cited
U.S. PATENT DOCUMENTS

| | | | |
|---|---|---|---|
| 2,118,157 | 5/1938 | Camp | 210/519 X |
| 3,161,590 | 12/1964 | Weis et al. | 210/519 X |
| 3,195,727 | 7/1965 | Kibbee | 210/521 X |

Primary Examiner—Morris O. Wolk
Assistant Examiner—Arnold Turk
Attorney, Agent, or Firm—Theodore B. Roessel; Roger Aceto

[57] ABSTRACT

A baffle for use in sewage or water settling tanks and the like which helps in establishing a substantially uniform flow of liquid down the tank across its entire vertical cross sectional area by dissipating as much of the energy of the incoming fluid stream as possible before allowing the fluid to flow down the settling tank. The energy of the stream is dissipated in part by deflectors which are arranged to direct the flow of liquid into and around a dead space prior to discharge into the settling tank.

7 Claims, 2 Drawing Figures

BAFFLE FOR WATER OR SEWAGE SETTLING TANKS

BACKGROUND OF THE INVENTION

The present invention relates to baffles for use in sewage and water settling tanks and more particularly to a baffle arrangement which establishes a substantially uniform flow in any vertical plane parallel to the planes of the end walls of the tank. This permits a "wall of water" to proceed at a uniform velocity down the tank from the inlet end to the outlet end.

It is known that the settling rate is enhanced in any sewage or water settling tank by maintaining flow in the tank uniform and non-turbulent, both at the surface of the tank and at the bottom and across the width of the tank. The liquid to be treated is usually introduced at one end of the tank through one or two inlet openings. This creates a great rush of liquid at the inlet end and the liquid must move down the tank some distance before the desired uniform flow is established. One way of breaking up this rush of liquid at the inlet and is simply to place a baffle plate immediately in front of each inlet opening so that the stream of liquid on striking the plate is deflected both upwardly and downwardly by the plate. This has the effect of producing a vertical flow along the inlet end wall of the tank which is not desired. Further, the stream after striking the baffle plate as described still must flow some linear distance from the end wall before the liquids assume a smooth, uniform, non-turbulent flow. Increasing the number of baffles to provide the incoming liquid with a more tortuous flow path or increasing the number of inlet openings are other ways used to rapidly transform the stream of incoming liquid to a smooth, uniform, flow in the tank.

The present invention provides a simple, single baffle arrangement which quickly dissipates the energy of the stream of untreated liquid discharged to the tank so that a smooth, non-turbulent, uniform flow is quickly established. The construction of the baffle is such that it can be readily made from any light weight material such as fiberglass and installed into any existing settling tank. The structure of the baffle also is such that it can be formed integral with a scum trough so that the scum trough and the baffle can be incorporated into the settling tank as a single unitary structure.

SUMMARY OF THE INVENTION

The present invention may be characterized in one aspect thereof by the provisions of a vertical panel having upper and lower sections; a spacer extending at right angles to the upper section for both connecting the panel to, and spacing it from the inlet end wall of a settling tank, the upper section of the panel, the spacer and the end wall of the settling tank defining a downwardly opening chamber when the panel is fixed to the end wall; deflector members on the panel extending downwardly and inclined inwardly toward the settling tank end wall, the members being located directly in front of the inlet openings so that the inlet streams of untreated liquid impinge on the deflectors and are directed upwardly into and around the chamber; and the lower section of the panel being provided with a plurality of openings for allowing the liquid flowing down from the chamber to enter horizontally into the settling tank.

DESCRIPTION OF THE PREFERRED EMBODIMENTS

Figure 1:
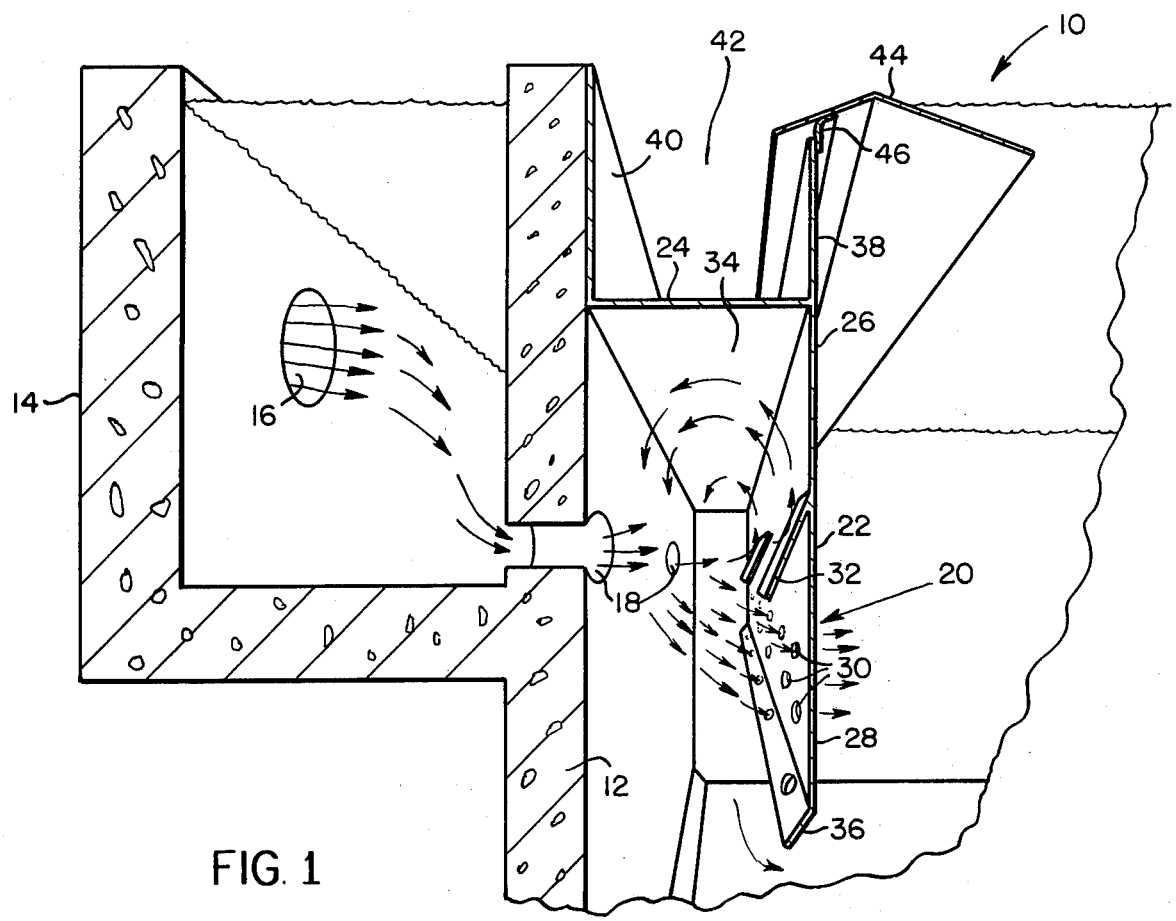
FIG. 1 is a perspective view of the baffle according to the present invention as viewed from below the surface of the liquid in the settling tank.
Figure 2:
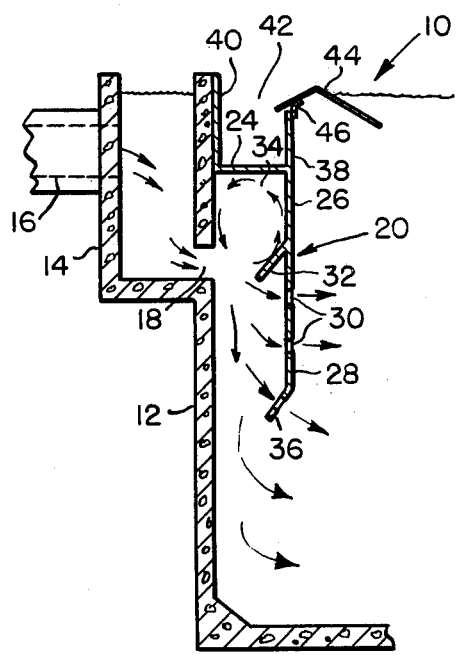
FIG. 2 is a view in section showing on a smaller scale, a portion of the sewage settling tank with the baffle of the present invention.

Referring to the drawings, FIG. 1 shows a portion of a water or sewage settling tank generally indicated at 10 wherein the reference numeral 12 indicates the inlet end wall of the settling tank. This end wall, as is known in the art, is provided with a distributor channel 14 which runs substantially the full width of the settling tank. The liquid to be treated is discharged into this channel through a conduit 16. The liquid from the conduit flows down and fills the channel and is in turn discharged into the settling tank through a plurality of spaced inlets 18 only two of which are shown. This provides for the introduction of the liquid to be treated into the settling tank at spaced intervals over substantially the full width of the tank. With the arrangment described thus far, the energy of the liquid streams entering through inlets 18 will gradually dissipate in the liquid in the settling tank. As the distance from end wall 12 increases the flow of liquid in the tank will become less and less turbulent until there is a uniform, non-turbulent, flow of liquid across substantially the full vertical height and width of the settling tank. However, this occurs at some distance down the settling tank and between this point and the end wall 12 there are turbulent areas which interfere with settling. These areas of high turbulence and the least effective settling is, of course, greatest at the inlet end wall 12 and gradually diminished as liquid moves away from this wall. In any event, for some distance down the tank from the inlet end wall little or no settling occurs because of the turbulence created by the streams of untreated liquid flowing into the tank. This distance may be decreased and consequently the efficiency of the settling tank increased by slowing down the introduction of liquid, increasing the number of inlets 18 or by providing a series of baffles to distribute the stream of untreated liquid over a greater vertical cross sectional area.

The dissipation of the energy of the streams of liquid flowing into the tank and distribution of the liquid over a relatively large cross sectional area is accomplished according to the present invention by the baffle configuration indicated at 20 which is adapted to be attached to end wall 12 by any suitable means (not shown). As shown in FIG. 1 the baffle includes a vertically oriented panel 22 which is held spaced outwardly from the tank end wall 12 by a generally horizontal spacer member 24. The vertical panel includes an upper section 26 and a lower section 28, the lower section being perforated by a plurality of openings 30. Intermediate the upper and lower sections are spaced deflectors 32. These deflectors extend from a side of vertical panel 22 and are inclined from the vertical panel downward and inward toward tank end wall 12. The deflectors are spaced along the vertical panel so as to locate them directly in front of each inlet 18.

The deflectors are thus arranged to direct the stream of liquid from each inlet 18 upwardly into a chamber 34 defined by the upper baffle section 26, spacer 24 and tank end wall 12. Since the upper baffle section and the spacer are solid and imperforate, chamber 34 is essentially a dead space so that the streams of liquid being deflected upwardly into the chamber must reverse direction and flow downwardly in order to leave the chamber. As liquid flows downwardly from the chamber, it can enter into the settling tank proper through baffle openings 30 and around the lower most end 36 of the baffle.

Due to the circulation of liquid up into and around chamber 34, the velocity of the liquid is decreased and energy dissipated before the liquid moves through baffle openings 30. In this respect, the dead space of chamber 34 provides a relatively large volume into which the liquid from inlet 18 can flow thereby reducing its velocity. The circuitous route traveled by the liquid also aids in reducing velocity so that by the time the untreated liquid flows up into and around chamber 34 and then down between end wall 12 and the baffle and then through baffle openings 30, the initial velocity of the liquid is reduced considerably. Furthermore, the discharge of the liquid through and around the baffle is accomplished over the relatively large vertical area extending from the bottom of the settling tank to the upper most row of openings 30. With this arrangement, therefore, the liquid to be treated entering the settling tank very quickly assumes a relatively uniform, non-turbulent flow so that the settling rate and efficiency of the tank is improved.

Another advantage of the present invention is that the vertical panel 22 and horizontal spacer 24 can be made of a relatively light weight material such as fiberglass so that the panel and spacer can be easily incorporated into existing settling tanks.

As a further feature of the present invention, vertical panel 22 can be extended upwardly so as to provide a wall portion 38 upstanding from spacer 24. A second opposite wall 40 also upstanding from spacer 24, together with spacer 24 and wall 38 defines an upwardly opening scum removal trough 42 extending along substantially the full width of wall 12. The operation and function of a scum removal trough is well known in the settling art and it is sufficient for the purposes of the present invention merely to say that scum and other materials which float on the liquid in the settling tank can be removed via the scum trough. Assisting in such removal is a floating beach arrangement 44 which is connected to the upper edge of wall 38 by a hinge number 46. The beach itself forms no part of the present invention and its operation and function is more fully described in my copending applications Ser. No. 654,561, filed Feb. 2, 1976.

Thus, the present invention provides a simple low cost baffle arrangement for transforming the relatively turbulent inlet streams of untreated liquid to substantially uniform non-turbulent flow in a relatively short distance. The baffle of the present invention is simply and easily constructed and can be incorporated into existing settling tanks to improve settling efficiencies. The provision of a chamber or dead space 34 provides a volume into which inlet liquid can flow to dissipate energy without interfering with the flow and settling characteristics of the tank. Further, the relatively high vertical extent of the lower baffle section 28 together with its several tiers of openings 30 allow for introduction of fluid into the settling tank over a relatively large cross sectional area. As a still further advantage, the present invention provides a simple one-piece construction for a baffle and scum trough which can be easily incorporated into new or existing water or sewage settling tanks.

Having thus described the invention in detail, what is claimed as new is:

1. A baffle for water or sewage settling tanks adapted for attachment to an end wall of the tank containing inlets from which liquid to be treated enters the tank, said baffle comprising:
   a. an upright panel;
   b. a spacer fixed to and extending substantially normal to said upright panel for attaching said panel to the end wall of the tank containing said inlets;
   c. at least one deflector on said upright panel, said deflector extending outwardly therefrom in the direction of said spacer and downwardly, said deflector being below said spacer so as to deflect liquid impinging thereagainst upwardly toward said spacer; and
   d. said upright panel in the area between said spacer and deflector being solid and said upright panel in the area below said deflector having a plurality of horizontally and vertically spaced openings therethrough to permit the passage of liquid to be treated through said upright panel.

2. A baffle as in claim 1 including a plurality of said deflectors spaced along said panel.

3. A baffle as in claim 1 wherein said spacer defines a solid surface running substantially the full length of said panel.

4. A baffle as in claim 3 wherein said upright panel extends above said spacer to form a first wall portion upstanding from said spacer, said first wall portion and spacer defining respectively the base and a side of a scum trough.

5. A baffle as in claim 4 including a second wall portion upstanding from said spacer and extending substantially parallel to said first wall portion, and spacer and wall portions together defining the base and side walls of a scum trough.

6. In combination with a water or sewage settling tank having a bottom and an end wall containing inlets for the liquid to be treated, a flow distributing baffle comprising:
   a. an upright panel located in the tank adjacent the end wall thereof;
   b. a spacer extending substantially horizontally between and connected to said panel and the end wall;
   c. deflectors on said panel associated with each of the inlets, each deflector being below said spacer and extending outwardly and downwardly from said panel towards the end wall of the tank so as to deflect a stream of liquid from each inlet upwardly towards said spacer;
   d. said spacer, said panel in the area between said spacer and deflector, and the end wall of the tank together defining three sides of a downwardly opening chamber into which liquid is directed by said deflectors; and
   e. said panel below said deflector having a plurality of horizontally and vertically spaced openings therethrough to permit liquid between the end wall and said panel to flow into the tank.

7. A combination as in claim 6 including at least one wall upstanding from said spacer generally parallel to said panel, said spacer and wall defining respectively the bottom and wall of a scum trough.

* * * * *